Sept. 4, 1956 A. H. DICKINSON 2,761,965

ELECTRONIC CIRCUITS

Filed Sept. 30, 1952 2 Sheets-Sheet 1

INVENTOR
ARTHUR H. DICKINSON
BY Joseph C. Sweet, Jr.
ATTORNEY

Sept. 4, 1956 A. H. DICKINSON 2,761,965

ELECTRONIC CIRCUITS

Filed Sept. 30, 1952 2 Sheets-Sheet 2

INVENTOR
ARTHUR H. DICKINSON
BY
Joseph C. Sweet, Jr.
ATTORNEY

United States Patent Office 2,761,965

Patented Sept. 4, 1956

2,761,965

ELECTRONIC CIRCUITS

Arthur H. Dickinson, Greenwich, Conn., assignor to International Business Machines Corporation, New York, N. Y., a corporation of New York Application September 30, 1952, Serial No. 312,318

23 Claims. (Cl. 250—27)

This invention relates to electronic circuits and, more particularly, to electronic counter and trigger circuits employing transistors.

The transistor was initially described in an article by Bardeen and Brattain in Physical Review, vol. 74, pp. 230–231, July 15, 1948. It has since been described in greater detail in an article by the same authors in Physical Review, vol. 75, pp. 1208–1225, April 15, 1949.

Since that time various forms of transistors have been produced, including the coaxial transistor, the junction transistor and the fieldistor.

These are described in the following articles:

Kock and Wallace "Coaxial Transistors," Electrical Engineering, vol. 68, pp. 222–223, March 1949;

Shockley et al., "p-n Junction Transistors," Physical Review, vol. 83, pp. 151–162, July 1, 1951;

Stuetzer: "A Crystal Amplifier with High Input Impedance," Proceedings of the I. R. E., vol. 38, pp. 868–871, August 1950.

Briefly, the basic transistor comprises a small block of semi-conductor material to which are applied at least three electrodes, termed base, collector and emitter, respectively. The semi-conductor material may be either of n-type (indicating that the charges in the material normally available for carrying current are negative, i. e., electrons) or p-type (indicating that the charges in the material normally available for carrying current are positive, i. e., "holes"). It has been found that silicon and germanium, and particularly the latter, are suitable semi-conductor materials. In the original point contact, or "Type A" transistor, and the fieldistor the body block is composed of only one type of semi-conductor material before surface treatment, and in the case of germanium the type usually employed is n-type. In the case of the junction transistor, the body block is composed of three or more layers of alternately n- and p-type semi-conductor material (usually germanium) and the contacts are of the ohmic type, rather than being point contacts. When potentials are properly applied between the base and each of the other two electrodes, a translating device is produced wherein variations in current in the collector-base or output circuit are produced by variations in voltage or current in the emitter-base or input circuit.

The theory and operation of the transistor are described in detail in the above articles.

Pulse counter circuits employing transistors have been developed in the art to replace pulse counter circuits employing vacuum or gas tubes. These transistor pulse counter circuits have the advantage that they require no heater or filament power, develop considerably less heat, and do not require as high operating potentials as prior counter circuits. However, the stability of these transistor trigger circuits left much to be desired in that adjustments were usually required each time a transistor counter had its transistor replaced and, which was even more of a disadvantage, even when it was energized again after a period of deenergization, regardless of the length of the latter.

Electronic trigger circuits employing an electronic discharge device or tube in combination with a transistor to overcome the above difficulties are disclosed in my prior co-pending applications, Serial Nos. 177,446 and 177,447, each filed August 3, 1950, and entitled Electronic Amplifier. Further, a plurality of such transistor-tube combinations arranged to form a trigger circuit chain are disclosed in my prior co-pending application, Serial No. 177,445, also filed August 3, 1950, and entitled Trigger Circuit Chain, now U. S. Patent No. 2,623,170 issued December 23, 1952.

However, since the output current flowing in the trigger circuits of my above applications flows in a circuit common to both the electron discharge device and the transistor, the magnitude of the load driven by the output must be kept small in order not to influence the trigger circuit and affect its maximum switching speed.

Accordingly, a principal feature of this invention is the provision of trigger and pulse counter circuits having improved stability and employing a discharge device or tube in combination with a transistor to produce a trigger or pulse counter circuit having two stable states alternately assumed, and a cooperating output or load circuit providing an output current isolated from the current flow through the balance maintaining portion of the transistor-tube circuit.

Another feature of this invention is the provision of such a trigger or pulse counter circuit wherein the additional output or load circuit includes a transistor.

Another feature of this invention is the provision of a plurality of serially arranged counter stages utilizing transistors in which each successive stage has a non-indicating, a primed and an indicating condition.

Another feature of this invention is the provision of a plurality of such serially arranged counter stages in a commutator.

Another feature of this invention is the provision of a plurality of such serially arranged counter stages to form a pulse counter circuit operating as a quinary counter.

Another feature of this invention is the provision of a plurality of such serially arranged counter stages to form a pulse counter circuit operating as a bi-quinary counter.

Another feature of this invention is the provision of such a trigger circuit arranged as a scaler.

Other features of the invention will be pointed out in the following description and claims and illustrated in the accompanying drawings, which disclose, by way of example, the principle of the invention and the best mode, which has been contemplated, of applying that principle.

Figure 1:
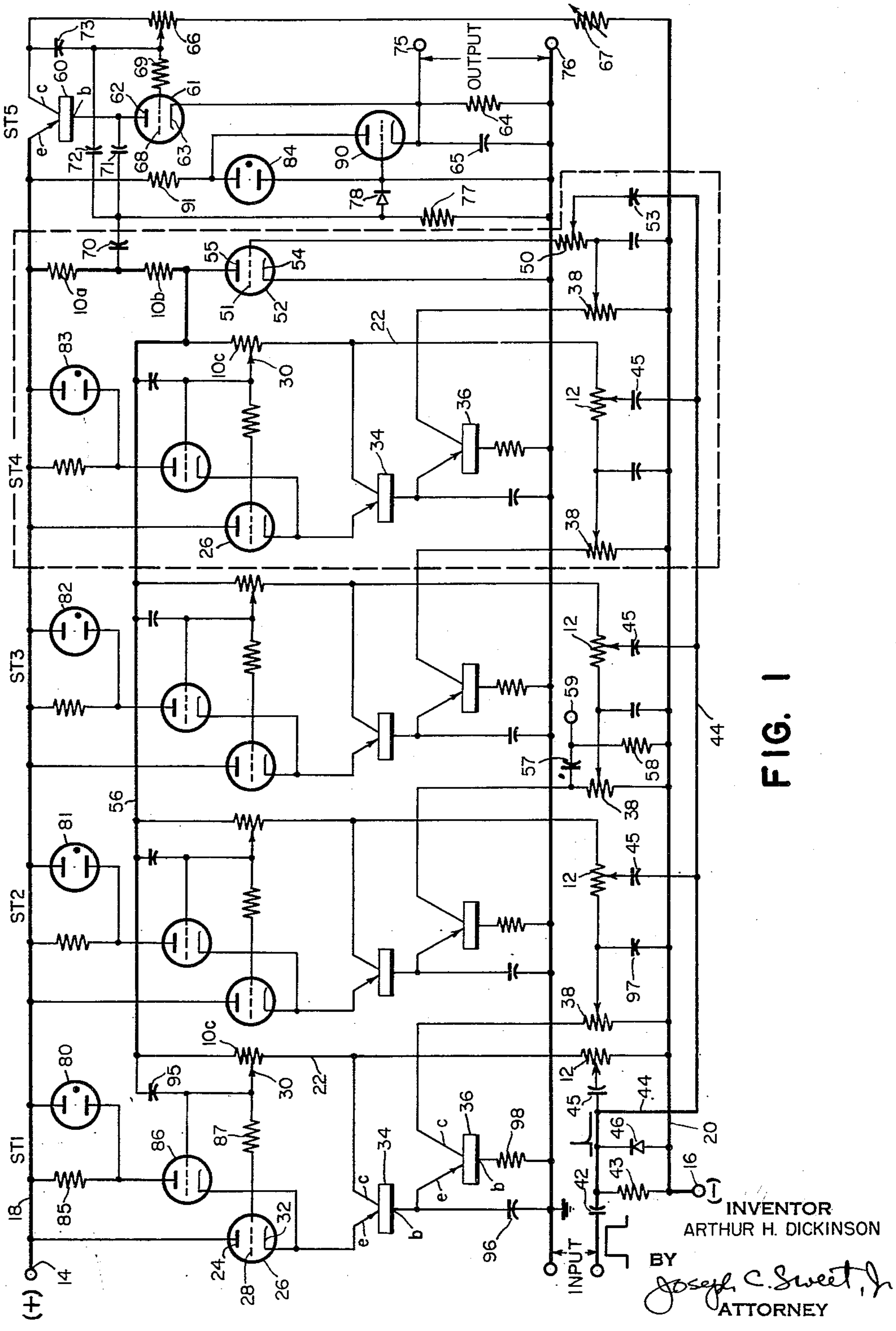
Fig. 1 is a circuit diagram of a bi-quinary counter in accordance with this invention.
Figure 2:
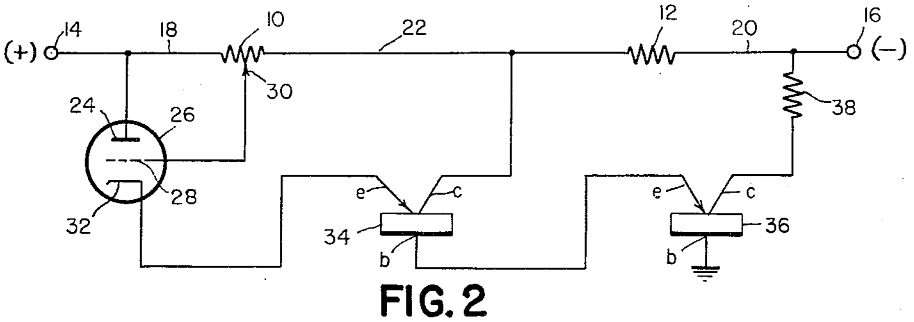
Fig. 2 is a circuit diagram of the basic trigger circuit employed in each of the first four counter stages of the bi-quinary counter of Fig. 1.

The bi-quinary counter shown in circuit diagram form in Fig. 1 includes four similar stages ST1–ST4, the basic circuit of which is shown separately in Fig. 2 for clarity. As shown in Figs. 1 and 2, each stage or counter circuit ST1–ST4 includes an electron discharge device or tube 26 and two transistors 34 and 36. Anode 24 of tube 26 is connected to positive terminal 14 of a suitable voltage supply. Cathode 32 of tube 26 is connected to emitter *e* of transistor 34. Base *b* of transistor 34 is connected to emitter *e* of transistor 36, and base *b* of the latter is grounded. The anode-cathode path of tube 26 is thus connected in series with the emitter-base paths of transistors 34 and 36. A voltage divider comprising resistances 10 and 12 is connected as shown by means of lines 18, 20 and 22 between positive terminal 14 and negative terminal 16 of the voltage supply. Collector *c* of transistor 34 is connected to line 22 joining resistances 10 and 12, and slider 30 of the potentiometer 10 is connected to control grid 28 of tube 26. Lastly, a load impedance in the form of resistor 38 is connected between collector *c* of transistor 36 and negative terminal 16 of the voltage supply.

The portion of the circuit including tube 26 and transistor 34 is disclosed in my application Serial No. 177,447, referred to above. As there disclosed, this tube-transistor combination constitutes a bi-stable trigger circuit. When Off, tube 26 is non-conductive and there is no current flow through the input or emitter circuit of transistor 34. Thus, the impedance of the collector or output circuit of this transistor is high and the voltage across resistor 12 is not only at the lower of its two values but also is less than the potential difference between terminal 16 and ground. In other words, the potential of the junction of resistors 10 and 12 is below ground and, similarly, the point on potentiometer 10 to which grid 28 is connected is also sufficiently below ground in potential to maintain tube 26 non-conducting. If a positive pulse is now applied to resistors 10 or 12 or their junction at line 22, the negative grid bias on tube 26 will be reduced so that it conducts.

The application of such a positive pulse to resistor 12 is shown in Fig. 1, this positive pulse being derived from the input square wave which is differentiated by means of condenser 42 and resistor 43 and then coupled via line 44 and the respective condenser 45 to the slider on the associated resistor 12. A crystal rectifier or diode 46, poled as shown, is connected in shunt across differentiating resistor 43 to prevent the negative differentiated pulses from being applied to resistor 12.

When the negative grid bias of tube 26 is reduced due to the application of a positive pulse to resistor 12, the resultant current flow through tube 26 returns to ground through the emitter circuit of transistor 34 and thus decreases the impendance of the collector circuit of the latter. The current flow through resistor 12 and line 20 thus increases and the voltage drop across resistor 12 increases until the potential at line 22 at the junction of resistors 10 and 12 rises to a value very close to ground. The potential at slider 30 of potentiometer 10 thus also rises to bias tube 26 either at or above cutoff. The trigger circuit thus far described maintains itself in this On status until the potentials at the various electrodes are changed by some outside means.

One way of returning the circuit to its Off condition is to apply a negative pulse to either resistor 10 or resistor 12 or their junction at line 22. Such a negative pulse will reduce the potential of control grid 28 and cause a reduced current flow through tube 26 and emitter *e* of transistor 34, which in turn will cause a decreased current flow in the collector circuit of transistor 34, including resistor 12. If the applied negative pulse is large enough, the potential of grid 28 relative to ground will be reduced beyond cutoff and tube 26 (and the emitter-base circuit of transistor 34) will then be non-conducting until the potentials obtaining in the circuit are again varied. Thus, a positive pulse is necessary to switch this circuit On, and a negative pulse is necessary to switch it Off.

Primarily because the inherent impedance characteristic of the collector circuit of a transistor is relatively high, the values of resistors 10 and 12 must also be high. Thus no appreciable load can be derived from resistors 10 and 12, which comprise the principal output source of the transistor-tube combination whose operation as thus far described is set forth in my above application Serial No. 177,447. If an appreciable load is coupled to either of resistors 10 or 12, the operation of the circuit as a trigger will be influenced deleteriously and its top speed of switching will be reduced.

The addition of the second transistor 36, in accordance with the present invention, overcomes the above difficulties. While the emitter-base circuit of this second transistor 36 is connected in series with the anode-cathode path of tube 26 and the emitter-base path of transistor 34, the current flowing through its output or load impedance 38 is isolated from the current flowing through the balance maintaining portion of the circuit. The value of load impedance 38 can thus be any value consistent with transistor operation and therefore can be matched with various loads as required.

As shown in Fig. 1, each successive trigger stage of stages ST1–ST4, i. e., stages ST2–ST4, has its resistor 12 connected through a variable portion of the load impedance 38 of the previous stage to line 20 and negative terminal 16 of the voltage supply. The purpose of this connection is to provide each successive stage with three conditions of operation: non-indicating, primed and indicating. This operation will be apparent from Fig. 3, which shows the wave forms existing at various points in the circuit of Fig. 1.

Figure 3:
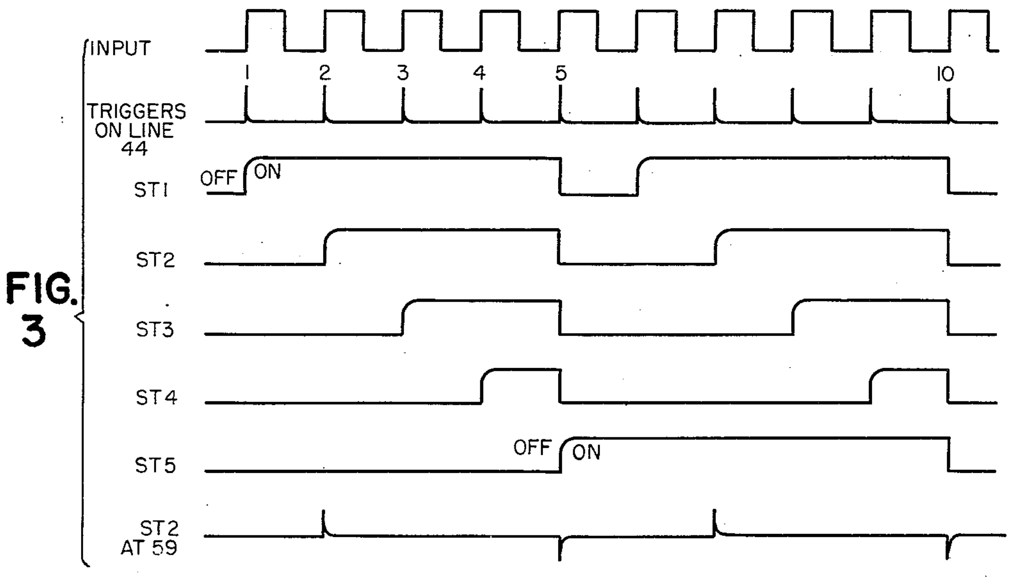
Fig. 3 shows the wave forms at various points in the circuit of Fig. 1.

The top line of Fig. 3 shows the square wave input pulses applied to the differentiating network comprising condenser 42 and resistor 43, and the second line shows the resultant differentiated positive triggers on line 44 which are applied simultaneously to each of stages ST1–ST4 through respective coupling condensers 45. Assuming that each of stages ST1–ST4 is initially in Off or non-indicating status, the first positive pulse appearing on line 44 can, by proper adjustment of the sliders on each of load impedance potentiometers 38, be made effective only as to stage ST1. Stage ST1 is thus switched to its On or indicating condition by this first pulse, and the resultant rise in potential across its load impedance 38 is shown in the third line of Fig. 3. This rise in potential across load impedance 38 of stage ST1 is sufficient to prime stage ST2 so that it will in turn be switched to its On or indicating status by the next or second trigger pulse on line 44. The resultant successive increase in potential across load impedance 38 of stage ST2 is shown in the fourth line of Fig. 3, and in turn is effective to prime stage ST3 so that it will be switched to its On or indicating condition by the next or third trigger pulse on line 44. The resultant output wave forms across the respective load impedances 38 of stages ST3 and ST4 are shown in the fifth and sixth lines of Fig. 3, these stages being switched to their On or indicating status in response to successive pulses in the manner just described in connection with stages ST1 and ST2.

The slider of load impedance potentiometer 38 of the fourth stage ST4 is connected through the resistance element of another potentiometer 50 through to control grid 51 of an additional electron discharge device or tube 52. The input trigger pulses on line 44 are connected to the slider of this potentiometer 50 through a coupling condenser 53 and thus are coupled to control grid 51. Cathode 54 of tube 52 is grounded, and its anode 55 is connected through load impedances 10*a* and 10*b*, and line 18 to positive terminal 14 of the voltage supply. The junction of load resistor 10*b* and anode 55 is connected via line 56 to one end of the individual resistors 10*c* of each of stages ST1–ST4. Load impedances 10*a* and 10*b* are thus common to each of stages ST1–ST4 and control the bias thereon in a manner now described.

It was assumed above that initially each of stages ST1–ST4 was in its Off or non-indicating condition. For these conditions to obtain, control stage tube 52 must also be in its Off status and the potential drop across its series load impedances 10*a* and 10*b* therefore at a minimum. This condition continues until stage ST4 is switched to its On or indicating status. The resultant rise in potential across load impedance potentiometer 38 of stage ST4, as shown in the sixth line of Fig. 3, reduces the bias on control grid 51 of tube 52 and thus primes this tube to be switched to its On status by the next successive trigger pulse on line 44. When tube 52 is switched to its On status, the increased current flow through its series load impedances 10*a* and 10*b* causes a drop in potential of line 56 sufficient to reduce the potential at the control grid 28 of each of tubes 26 of stages ST1–ST4 below cutoff. Each of stages ST1–ST4 is thus simultaneously returned to its Off or non-indicating condition, as shown in lines 3—6 of Fig. 3, and the first stage ST1 is again ready to be switched to its On or indicating condition in response to the next or sixth pulse on line 44. Tube 52 also returns to its Off status with the termination of the fifth trigger pulse on line 44 and the drop in potential across load impedance potentiometer 38 of stage ST4 when this stage returns to its Off or non-indicating status.

The circuit thus far described constitutes a quinary counter and may also be used as a five step commutator by deriving an output from suitable points such as load impedances 38. Differentially timed pulses may also be derived from the circuit; for example, the differentiated pulses shown in line 8 of Fig. 3 may be derived from the second stage ST2 load impedance potentiometer 38 through differentiating condenser 57 and resistor 58 connected to output terminal 59 as shown.

The addition of stage ST5 to the circuit of Fig. 1 thus far described provides a bi-quinary counter. Stage ST5 includes a transistor 60 and an electron discharge device or tube 61 as described in my prior co-pending application Serial No. 177,446, referred to previously. The emitter *e* of transistor 60 is connected via line 18 to positive terminal 14, its base *b* is connected to anode 62 of tube 61, and cathode 63 of the latter is connected to ground through the parallel combination of cathode resistor 64 and condenser 65. Potentiometer 66 and variable resistor 67 are connected between collector *c* of transistor 60 and negative line 20 leading to terminal 16 of the voltage supply. The slider of potentiometer 66 is connected to control grid 68 of tube 61 through parasitic suppressor resistor 69 of low ohmic value. The junction of load resistances 10*a* and 10*b* of tube 52 is connected to the junction of anode 62 and base *b* of transistor 60 through series condensers 70 and 71, the junction of condensers 70 and 71 is connected to collector *c* of transistor 60 through series condensers 72 and 73, and the junction of condensers 72 and 73 is connected to the junction of resistor 69 and the slider of potentiometer 66.

As described in my application Serial No. 177,446, stage ST5 constitutes a binary counter or scaler having two stable operating conditions alternately assumed and switchable in response to successive applied pulses of the same polarity. Assume that initially stage ST5 is in its Off or non-indicating condition due to a proper adjustment of the slider of potentiometer 66 and of variable resistor 67. In this condition there is no appreciable current flow through either transistor 60 or tube 61. However, when a negative pulse is applied to the base of transistor *b*, as occurs at the instant when tube 52 is switched to its On status due to coupling condensers 70 and 71 connected to the junction of load resistors 10*a* and 10*b* of tube 52, current is caused to flow momentarily in the emitter-base circuit of transistor 60. Due to transistor action current also flows in the collector circuit of transistor 60, thus raising the potential at the slider of potentiometer 66 such that the potential at grid 68 of tube 61 is at or above cutoff. Current thus flows through the anode-cathode path of tube 61 and through cathode output impedance 64 to constitute a return circuit for the emitter-base path of transistor 60. Stage ST5 will then remain in its On or indicating status until there is a further variation in the potentials applied thereto, as shown in line 7 of Fig. 3. When the next successive negative pulse is applied to the junction of anode 62 and base *b* of transistor 60, simultaneously with and due to the tenth input trigger pulse on line 44 switching tube 52 again to its On status momentarily, this pulse will have no effect at this junction since the emitter-base path of transistor 60 is already conducting at its maximum current value. However, this negative pulse is also applied via condensers 72 and 73 to collector *c* of transistor 60 and via condenser 72 and parasitic suppressor resistor 69 to control grid 68 of tube 61. The resultant reduction in potential of the control grid of tube 61 biases this tube beyond cutoff to end its current conduction, and the reduction in potential of collector *c* of transistor 60 further reduces the potential of control grid 68 due to the decreased current flow through potentiometer 66 and variable resistor 67. Current flow through the emitter-base path of transistor 60 thus ceases and stage ST5 switches to its Off or non-indicating condition until the potentials applied to this stage are again varied. The output of stage ST5 may conveniently be taken from terminals 75 and 76 connected at the extremities of cathode resistance 64.

Condensers 65 and 73 are included to make stage ST5 a scaler circuit since, as described above in my co-pending application Serial No. 177,446, they act as voltage change delay elements to provide more rapid tube and transistor response during the initial portion of a switching operation. While either one or the other may be omitted, it is preferable to utilize both in the circuit to insure reliability of operation.

It is to be noted that a differentiating resistor 77 is connected between ground and the junction of condensers 70 and 71 and that the capacitance of condenser 70 is made small in order that it may function as a differentiating condenser in order to further sharpen the negative pulses appearing at the junction of resistors 10*a* and 10*b* when tube 52 is momentarily turned On and Off in response to the 5th, 10th, 15th, etc., successive trigger pulses appearing on line 44. A crystal rectifier or diode 78, poled as shown, is connected across differentiating resistor 77 to bypass the positive differentiated pulses which would otherwise be applied to condensers 71 and 72.

For the purpose of indicating the status of each of stages ST1–ST5, indicating lamps 80—84 respectively of the neon type are provided. In each of stages ST1–ST4 the respective lamp 80, 81, 82 or 83 is shunted by a load resistor 85 connected between the anode of an electron discharge device or tube 86 and line 18 leading to positive terminal 14 of the voltage supply. The cathode of this tube 86 is connected to the cathode 32 of the respective tube 26 and its control grid is connected to the respective control grid 28 of tube 26 through a parasitic suppressor resistor 87. When tube 26 of any one of stages ST1–ST4 is conducting, i. e., when the stage is in its On or indicating status, the paralleled tube 86 will also be conducting and the potential drop across its resistor 85 will be a maximum so that the respective neon lamp 80, 81, 82 or 83 will conduct current and glow. On the other hand, when a tube 26 is non-conducting, the accompanying paralleled tube 86 will also be non-conducting and thus reducing the potential drop across its resistor 85 to zero. The respective neon lamp 80, 81, 82 or 83 will therefore not conduct or glow.

In the case of stage ST5, an electron discharge tube or device 90 is provided having its control grid grounded, its cathode connected to the junction of cathode 63 of tube 61 and cathode resistor 64, and its anode connected to line 18 leading to terminal 14 of the voltage supply through a load resistor 91. Neon indicating lamp 84 is then connected between the anode and grid of tube 90. When stage ST5 is in its Off or non-indicating condition, the potential of cathode 63 of tube 61 is at ground due to the lack of current flow through cathode resistor 64, and tube 90 is thus conducting. The value of resistance 91 is chosen such that the resultant current flow therethrough reduces the potential across neon indicating lamp 84 sufficient to prevent it from glowing. On the other hand, when stage ST5 is in its On or indicating condition the resultant current flow through cathode resistor 64 raises the potential at the cathode of tube 90 to bias this tube beyond cutoff and reduce the current flow through resistor 91 to zero. The full magnitude of the potential between line 18 and ground is then applied across the terminals of neon indicating lamp 84 and it will glow.

Note that a condenser 95 is connected between line 56 and slider 30 of each of stages ST1–ST4. This condenser is included to increase the speed with which each of stages ST1–ST4 is returned to its Off or non-indicating condition when tube 52 momentarily conducts, inasmuch as this condenser shunts the portion of potentiometer 10*c* connected between tube 52 and each control grid 28.

Note, also, that a condenser 96 is connected between ground and base *b* of each transistor 34 of stages ST1–ST4, and that a condenser 97 is connected between negative line 20 and the slider of each load impedance potentiometer 38. The general purpose of each of these condensers is to provide a momentary delay in the application of the priming voltage to each successive stage to prevent two successive stages from being turned On by a single trigger pulse on line 44. At the instant that tube 26 and transistor 34 of each of stages ST1–ST4 begins to conduct, the current flow from the base *b* of the respective transistor 34 is shunted to ground through the associated condenser 96. There is therefore an exponential delay in the current rise in the emitter circuit of the associated transistor 36. This causes an exponential rise of current flow through the collector circuit of this transistor and its associated load impedance potentiometer 38. Each condenser 97 provides a further exponential delay, if desired, before application of the priming bias to the resistor 12 of the next successive stage. While condensers 97 are not necessary, they do provide a greater factor of safety. Also, a greater keying impulse amplitude range is achieved with these condensers in the circuit.

Note further that in Fig. 1 a load impedance in the form of resistor 98 is connected between ground and base *b* of transistor 36 of each of stages ST1–ST4. The circuit of Fig. 1 will function if this impedance is omitted, but its inclusion increases the magnitude of the priming bias applied to the successive stage and thus increases the reliability of operation.

It is also to be noted that, in a sense, with impedances 98 in the circuit the combination of each base impedance 98 and the associated transistor 36 itself constitutes a trigger circuit. See, Reich and Ungvary: "A Transistor Trigger Circuit," Review of Scientific Instruments, vol. 20, No. 8, pp. 586–588, August 1949. The remainder of each of the circuits of stages ST1–ST4 may then be considered merely an input circuit providing alternate positive and negative impulses to the emitter of the associated transistor 36 for switching this transistor between its Off or non-indicating and On or indicating conditions.

It is further to be noted that in each of stages ST1–ST4 of Fig. 1, the combination of the serially connected transistors 34 and 36 constitutes a trigger circuit either with or without the base impedance 98. In the event that base impedance 98 is not included, as in Fig. 2, the emitter-to-base impedance of transistor 36 serves as the external base impedance for transistor 34 to form a trigger circuit in the manner set forth in the above article. Tube 26 and the associated circuitry may then be considered merely an input circuit providing alternately positive and negative impulses to emitter *e* of transistor 34 for switching the trigger circuit. Note again that the output available at collector *c* of transistor 36 is independent of the current flowing through the trigger transistor 34.

When impedance 98 is included, as in Fig. 1, either transistor 34 or transistor 36 or the serial combination of both may be considered as a trigger circuit since each then has an external base impedance. The output may be taken from either collector, the magnitude of the load impedance in the collector circuit of each of transistors 34 and 36 then being adjusted to achieve the desired operating conditions and output impedances. Note again that the collector load impedance of each transistor is individual to that transistor to provide isolated outputs.

It will be recalled that the basic circuit of each of stages ST1–ST4 is not a binary counter or scaler, i. e., successive pulses having opposite polarities are required to switch each stage. However, a scaler may be formed by the addition of control stage tube 52 to the associated circuitry of any of stages ST1–ST4. For example, the circuitry of stage ST4 and control stage tube 52 shown within the dotted outline in Fig. 1 constitutes a single scaler stage responsive to successive pulses of the same polarity if the bias on tube 26 of stage ST4 is suitably adjusted, as by moving the slider of potentiometer 38 of stage ST3 to the grounded terminal thereof. Assume that ST4 is initially in its Off or non-indicating condition. The first trigger pulse appearing on line 44 then switches stage ST4 to its On status in the same manner as described above in connection with stage ST1, and the next successive trigger pulse on line 44 renders tube 52 momentarily conductive and switches stage ST4 to its Off status as previously described. Assuming that stages ST1–ST3 are disconnected or rendered inoperative by suitable adjustment of the potentiometer sliders associated with each stage, the scaler comprising stage ST4 and tube 52 will then be switched alternately On and Off in response to successive positive trigger pulses appearing on line 44. The output of the scaler may conveniently be taken from load impedance 38 of stage ST4.

It will be recalled that it has been assumed in connection with the operation of the circuit of Fig. 1 that initially each of stages ST1–ST5 and control stage tube 52 were in their Off condition. This can conveniently be accomplished by a "reset" operation involving merely increasing the negative potential at terminal 16 relative to ground.

Figure 4:
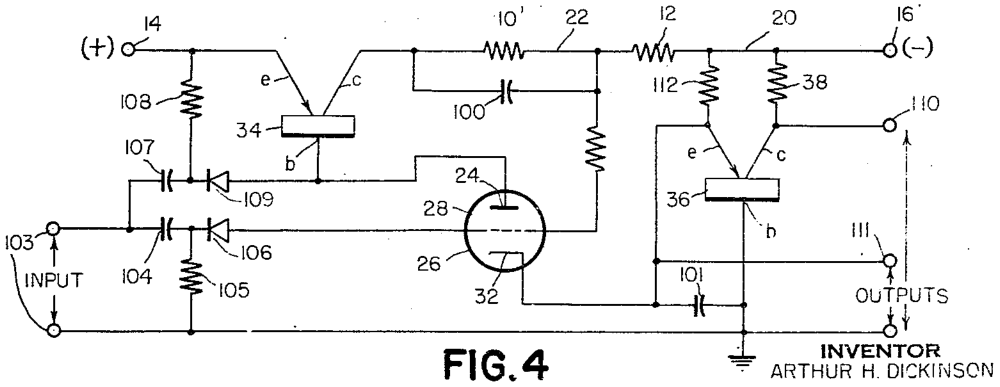
Fig. 4 illustrates an alternative embodiment of the basic trigger circuit of Fig. 2, arranged as a scaler circuit.

In Fig. 4 is shown an alternative embodiment of the basic trigger circuit of Fig. 2, arranged as a scaler. The major difference between the basic circuits is that in Fig. 4 the electron discharge device or tube 26 is connected between the transistors 34 and 36. Emitter *e* of transistor 34 is now connected to positive terminal 14 of the voltage supply and its base *b* is connected to anode 24 of tube 26. Cathode 32 of tube 26 is connected to emitter *e* of transistor 36 and base *b* of the latter is grounded. Collector *c* of transistor 34 is connected to negative terminal 16 of the voltage supply through a voltage divider comprising resistors 10′ and 12, and the junction of these resistors at line 22 is connected to control grid 28 of tube 26 through parasitic suppressor resistor 87 of low ohmic value. Load impedance 38 is connected between collector *c* of transistor 36 and line 20 leading to negative terminal 16.

To make the basic circuit thus far described a scaler or binary counter, an input circuit is provided for connecting the input pulses both to control grid 28 of tube 26 and base *b* of transistor 34 and delay circuit elements in the form of condensers 100 and 101 are connected across resistor 10′ and between cathode 32 of tube 26 and ground, respectively. As was pointed out above in connection with the scaler circuit of stage ST5, either of these condensers may be omitted. However, it is preferable to utilize both in the circuit to insure reliability of operation.

The input, which may be in the form of square waves, is connected to input terminals 103, one of which is grounded. The other terminal 103 is connected through a differentiating network, comprising condenser 104 and differentiating resistor 105, and crystal rectifier or diode 106 poled as shown to control grid 28. This other terminal 103 is also connected through a second differentiating network, comprising condenser 107 and differentiating resistor 108, and a second crystal diode 109 poled as shown to base $b$ of transistor 34 at the junction of this electrode and anode 24 of tube 26.

The operation of the circuit of Fig. 4 as a scaler is similar to that described above in connection with stage ST5, the differentiating networks and crystal diodes just referred to being utilized to insure that only negative impulses are applied simultaneously to base $b$ of transistor 34 and control grid 28 of tube 26. The switching of this circuit in response to successive negative pulses is also described in detail in my prior co-pending application, Serial No. 177,446, referred to previously. Note that in accordance with this invention the preferred output at terminal 110 connected to collector $c$ of transistor 36 is isolated from the current flow through the balance maintaining portion of the circuit including transistor 34 and tube 26. It is to be noted, however, that a second output is also available at terminal 111 connected to emitter $e$ of transistor 36, although the output current is then not independent of the balance maintaining portion of the circuit and the emitter-to-base impedance of transistor 36 then acts as a cathode impedance for tube 26.

Note that a resistor 112 is connected between emitter $e$ of transistor 36 and line 20 leading to negative terminal 16 of the voltage supply in order to bias this emitter below ground potential due to the voltage divider formed by this resistance and the back emitter-to-base resistance of transistor 36. By biasing this emitter below ground a greater output voltage swing is obtained from the circuit. The magnitude of the output may also be increased by inserting a base impedance between base $b$ of transistor 36 and ground in the manner shown in Fig. 1, either in place of or in conjunction with the use of resistor 112. However, the use of a base impedance does increase the output impedance of the circuit.

It is to be noted that the bi-quinary counter described above not only operates in the decimal notation but also achieves such operation by relying on predetermined voltage conditions rather than transient, tube blocking or pull-up arrangements which form the basis of many commonly employed feed-back methods. Further, it will be appreciated that while only one order of the counter has been shown and described, several orders can be combined to form a counter responsive to unit impulses or, with the provision of suitable carry devices well known in the art, can be combined to respond to differential values as an accumulator. In this connection the output at terminal 75 would be employed for effecting an entry of a count into the next higher and similar order of a multi-denominational counter, or for either effecting or controlling carry into the higher order of an accumulator. This output pulse source may also be employed for other control purposes, such as read-out or record preparing purposes as commonly required in record controlled accounting machines.

Such record controlled accounting machines employing electronic devices for receiving and manifesting digits usually operate in conjunction with commutators which provide either control voltages or differentially timed impulses on a cyclical basis. As pointed out previously, commutator control voltages are available at each of load impedance potentiometers 38 and, further, differentially timed impulses may be derived therefrom, as at terminal 59.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A trigger circuit comprising: a voltage supply having positive, negative, and intermediate potential terminals; an electron discharge device having an anode, cathode and control grid with its anode connected to the positive terminal of said supply; first and second transistors each having a base, an emitter and a collector electrode with the emitter electrode of the first transistor connected to said cathode and its base electrode connected to the emitter electrode of the second transistor; a connection from the base of said second transistor to the intermediate potential terminal of said supply; a voltage divider connected between the positive and negative terminals of said supply; a connection from a point on said voltage divider to said control grid and a further connection from a point between this point and the negative-most terminal of said voltage divider to the collector electrode of said first transistor; a load impedance connected between the collector electrode of said second transistor and the negative terminal of said supply; and input means for applying an input pulse to said control grid.

2. A plurality of serially arranged trigger circuits as in claim 1 wherein at least a portion of the voltage divider positive with respect to the control grid of each device is common to each said circuit and the negative terminal of the voltage divider of each successive trigger circuit is connected to the negative terminal of said voltage supply through at least a portion of the load impedance of the previous trigger circuit so as to vary the bias on the control grid of the device of the successive trigger circuit; and said input means includes means for applying input pulses simultaneously to all said control grids to trigger successive trigger circuits in response to successive pulses.

3. A plurality of serially arranged trigger circuits as in claim 1 wherein at least a portion of the voltage divider positive with respect to the control grid of each device is common to each said circuit and the negative terminal of the voltage divider of each successive trigger circuit is connected to the negative terminal of said voltage supply through at least a portion of the load impedance of the previous trigger circuit so as to vary the bias on the control grid of the device of the successive trigger circuit; and including a further electron discharge device having an anode, a cathode, and a control grid with said cathode connected to said intermediate potential terminal, said control grid connected to a point on the load impedance of the final trigger circuit, and said anode connected to said positive terminal through said portion of the voltage dividers common to each said circuit; and wherein said input means includes means for applying input pulses simultaneously to all said control grids to trigger successive trigger circuits in open-ring fashion in response to successive pulses.

4. A plurality of serially arranged trigger circuits as in claim 1 wherein at least a portion of the voltage divider positive with respect to the control grid of each device is common to each said circuit and the negative terminal of the voltage divider of each successive trigger circuit is connected to the negative terminal of said voltage supply through at least a portion of the load impedance of the previous trigger circuit so as to vary the bias on the control grid of the device of the successive trigger circuit; including a further electron discharge device having an anode, a cathode, and a control grid with said cathode connected to said intermediate potential terminal, said control grid connected to a point on the load impedance of the final trigger circuit, and said anode connected to said positive terminal through said portion of the voltage dividers common to each said circuit; wherein said input means includes means for applying input pulses simultaneously to all said control grids to trigger successive trigger circuits in open-ring fashion in response to successive pulses; and including a scaler circuit comprising: first and second impedances; a further transistor having a base, an emitter and a collector electrode with said emitter electrode connected to the positive terminal of said voltage supply and said collector electrode connected to the negative terminal of said supply through said first impedance; an additional electron discharge device having an anode, cathode, and control grid with its anode connected to the base electrode of said further transistor, its control grid connected to a point on said first impedance, and its cathode connected to said intermediate potential terminal through said second impedance; a condenser coupling the collector electrode of said further transistor and said last-mentioned control grid; a further condenser shunting said second impedance; and means coupling a point on said portion of the voltage divider common to each said trigger circuit to said last-mentioned control grid and to the junction of said last-mentioned anode and the base electrode of said further transistor.

5. A trigger circuit comprising: a voltage supply having positive, negative, and intermediate potential terminals; an electron discharge device having an anode, cathode, and control grid; first and second transistors each having a base, an emitter, and a collector electrode with the emitter electrode of the first transistor connected to the positive terminal of said supply and its base electrode connected to said anode; a connection from said cathode to the emitter electrode of said second transistor and a further connection from the base electrode of said second transistor to the intermediate potential terminal of said supply; a voltage divider connected between the collector electrode of said first transistor and the negative terminal of said supply; a connection from a point on said voltage divider to said control grid; a load impedance connected between the collector electrode of said second transistor and the negative terminal of said supply; and means for applying an input pulse to said control grid.

6. A scaler circuit comprising: a voltage supply having positive, negative, and intermediate potential terminals; an electron discharge device having an anode, cathode, and control grid; first and second transistors each having a base, an emitter, and a collector electrode with the emitter electrode of the first transistor connected to the positive terminal of said supply and its base electrode connected to said anode; a connection from said cathode to the emitter electrode of said second transistor and a further connection from the base electrode of said second transistor to the intermediate potential terminal of said supply; a voltage divider connected between the collector electrode of said first transistor and the negative terminal of said supply; a connection from a point on said voltage divider to said control grid; a load impedance connected between the collector electrode of said second transistor and the negative terminal of said supply; a condenser shunting the portion of said voltage divider between said collector electrode of said first transistor and the connection to said control grid and a further condenser connected between said cathode and said intermediate potential terminal; and means for applying input pulses simultaneously to said base electrode of said first transistor and to said control grid.

7. A scaler circuit comprising: a voltage supply having positive, negative, and intermediate potential terminals; an electron discharge device having an anode, cathode, and control grid; first and second transistors each having a base, an emitter, and a collector electrode with the emitter electrode of the first transisor connected to the positive terminal of said supply and its base electrode connected to said anode; a connection from said cathode to the emitter electrode of said second transistor and a further connection from the base electrode of said second transistor to the intermediate potential terminal of said supply; a voltage divider connected between the collector electrode of said first transistor and the negative terminal of said supply; a connection from a point on said voltage divider to said control grid; a load impedance connected between the collector electrode of said second transistor and the negative terminal of said supply; a condenser shunting the portion of said voltage divider between said collector electrode of said first transistor and the connection to said control grid; and means for applying input pulses simultaneously to said base electrode of said first transistor and to said control grid.

8. A scaler circuit comprising: a voltage supply having positive, negative, and intermediate potential terminals; an electron discharge device having an anode, cathode, and control grid; first and second transistors each having a base, an emitter, and a collector electrode with the emitter electrode of the first transistor connected to the positive terminal of said supply and its base electrode connected to said anode; a connection from said cathode to the emitter electrode of said second transistor and a further connection from the base electrode of said second transistor to the intermediate potential terminal of said supply; a voltage divider connected between the collector electrode of said first transistor and the negative terminal of said supply; a connection from a point on said voltage divider to said control grid; a load impedance connected between the collector electrode of said second transistor and the negative terminal of said supply; a condenser connected between said cathode and said intermediate potential terminal; and means for applying input pulses simultaneously to said base electrode of said first transistor and to said control grid.

9. A scaler circuit comprising: a voltage supply having positive, negative, and intermediate potential terminals; a first electron discharge device having an anode, cathode, and control grid with its anode connected to the positive terminal of said supply; first and second transistors each having a base, an emitter, and a collector electrode with the emitter electrode of the first transistor connected to said cathode and its base electrode connected to the emitter electrode of the second transistor; a connection from the base electrode of said second transistor to the intermediate potential terminal of said supply; a voltage divider connected between the positive and negative terminals of said supply; a connection from a point on said voltage divider to said control grid and a further connection from a point on said voltage divider between this point and said negative terminal to the collector electrode of said first transistor; a load impedance connected between the collector electrode of said second transistor and the negative terminal of said supply; a second electron discharge device having an anode, cathode, and control grid with its cathode connected to said intermediate potential terminal, its control grid connected to a point on said load impedance, and its anode connected to a point on said voltage divider positive with respect to said control grid of said first electron discharge device, and means for applying input pulses simultaneously to both said control grids.

10. A plurality of serially arranged counter stages, each successive stage having a non-indicating, a primed, and an indicating condition and each stage including a semi-conductor body, an emitter electrode, a base electrode, and a collector electrode in contact with said body, an impedance element connected between each of said base electrodes and a point of substantially fixed potential, means for applying operating voltages to said electrodes, means for applying trigger pulses simultaneously between two electrodes of each stage, and means connected between each succeeding stage and the previous stage for transferring the succeeding stage into its primed condition when the preceding stage is triggered by one of said trigger pulses into its indicating condition.

11. A plurality of serially arranged counter stages, each successive stage having a non-indicating, a primed, and an indicating condition and each stage including a semi-conductor body, an emitter electrode, a base electrode, and a collector electrode in contact with said body, an impedance element connected between each of said base electrodes and a point of substantially fixed potential, means for applying operating voltages to said electrodes, means for applying trigger pulses simultaneously between two electrodes of each stage, means connected between each succeeding stage and the previous stage for transferring the succeeding stage into its primed condition when the preceeding stage is triggered by one of said trigger pulses into its indicating condition, control means also responsive to said trigger pulses and having a normal, a primed and a switching condition and including means connected to the last counter stage for transferring said control means from its normal to its primed condition when the last counter stage is triggered by one of said trigger pulses into its indicating condition, and means connecting said control means and each of said counter stages to return each of said stages to its non-indicating condition in response to the next trigger pulse applied to said control means to transfer it to its switching condition.

12. A plurality of serially arranged counter stages, each successive stage having a non-indicating, a primed, and an indicating condition and each stage including a semi-conductor body, an emitter electrode, a base electrode, and a collector electrode in contact with said body, an impedance element connected between each of said base electrodes and a point of substantially fixed potential, means for applying operating voltages to said electrodes, means for applying trigger pulses simultaneously between two electrodes of each stage, means connected between each succeeding stage and the previous stage for transferring the succeeding stage into its primed condition when the preceding stage is triggered by one of said trigger pulses into its indicating condition, control means also responsive to said trigger pulses and having a normal, a primed and a switching condition and including means connected to the last counter stage for transferring said control means from its normal to its primed condition when the last counter stage is triggered by one of said trigger pulses into its indicating condition, means connecting said control means and each of said counter stages to return each of said stages to its non-indicating condition in response to the next trigger pulse applied to said control means to transfer it to its switching condition, and a final counter stage having two stable operating conditions alternately assumed and including a semi-conducting body, an emitter electrode, a base electrode, and a collector electrode in contact with said body, an impedance element connected between said last-mentioned base electrode and a point of substantially fixed potential, means for applying operating voltages to said electrodes, and means for applying the output of said control means to said final counter stage to trigger it from one stable operating condition to the other.

13. In combination: a pair of transistors each having a base, a collector, and an emitter electrode; an electron discharge device having an anode, a cathode, and a control grid; the emitter-base paths of said transistors and the anode-cathode path of said device being serially connected; a voltage divider; and connections from said control grid and one of said collector electrodes to respective points on said voltage divider.

14. A plurality of serially arranged trigger circuits as in claim 13, wherein a portion of the voltage divider of each device is common to each said circuit and another portion of the voltage divider of each successive trigger circuit is connected in circuit with the other collector electrode of the previous trigger circuit to serve as a load impedance for the latter and vary the bias on the control grid of the device of the successive trigger circuit; and input means for applying input pulses simultaneously to all said control grids to trigger successive trigger circuits in response to successive pulses.

15. A plurality of serially arranged trigger circuits as in claim 13, wherein a portion of the voltage divider of each device is common to each said circuit and another portion of the voltage divider of each successive trigger circuit is connected in circuit with the other collector electrode of the previous trigger circuit to serve as a load impedance for the latter and vary the bias on the control grid of the device of the successive trigger circuit; and including a further electron discharge device having an anode, cathode, and control grid with its anode connected to the control grids of said trigger circuits and its cathode connected to the free base electrode of the terminating transistor of each of said trigger circuits; a load impedance connected to the other collector of the final trigger circuit and to the control grid of said further electron discharge device to vary its bias; input means for applying input pulses simultaneously to all said control grids to trigger successive trigger circuits in open-ring fashion in response to successive pulses; and a scaler circuit comprising: first and second impedances; a further transistor having a base, an emitter, and a collector electrode with said collector electrode connected to said first impedance; an additional electron discharge device having an anode, cathode, and control grid with its anode connected to the base electrode of said further transistor, its control grid connected to a point on said first impedance, and its cathode connected to the cathode of said further electron discharge device through said second impedance; a condenser coupling the collector electrode of said further transistor and said last-mentioned control grid; a further condenser shunting said second impedance; and means coupling the output of said further electron discharge device to said last-mentioned control grid and to the junction of said last-mentioned anode and the base electrode of said further transistor.

16. A plurality of serially arranged trigger circuits as in claim 13, wherein a portion of the voltage divider of each device is common to each said circuit and another portion of the voltage divider of each successive trigger circuit is connected in circuit with the other collector electrode of the previous trigger circuit to serve as a load impedance for the latter and vary the bias on the control grid of the device of the successive trigger circuit; and including a further electron discharge device having an anode and a control grid with its anode connected to the control grids of said trigger circuits; a load impedance connected to the other collector electrode of the final trigger circuit and to the control grid of said further electron discharge device to vary its bias; and input means for applying input pulses simultaneously to all said control grids to trigger successive trigger circuits in open-ring fashion in response to successive pulses.

17. In combination: biasing means; a pair of transistors each having a base, a collector, and an emitter electrode; an electron discharge device having an anode, a cathode, and a control grid; the emitter-base paths of said transistors and the anode-cathode path of said device being serially connected and the series combination connected in parallel with said biasing means; a load impedance connecting one of said collector electrodes to said biasing means; a voltage divider connected to said biasing means; connections from said control grid and the other of said collector electrodes to respective points on said voltage divider; and means for applying input pulses to said control grid.

18. In combination: a pair of transistors each having an input and an output; a variable impedance connected serially with the inputs of said transistors; and a second impedance having connections therefrom to said variable impedance and to one of said outputs to provide feedback between said last-mentioned output and said variable impedance.

19. In combination: a plurality of transistors, each having a base, a collector and an emitter electrode, the emitter-base paths of said transistors being serially connected; and means for applying operating voltages to said electrodes including individual impedances connected, respectively, to said collector electrodes and the free base electrode.

20. In combination: a plurality of transistors, each having a base, a collector an an emitter electrode, the emitter-base paths of said transistors being serially connected; and means for applying operating voltages to said electrodes including individual impedances connected, respectively, to said collector electrodes.

21. In combination: a pair of transistors, each having a base, a collector and an emitter electrode, the emitter-base paths of said transistors being serially connected; means for applying operating voltages to said electrodes including first and second impedances connected, respectively, to said collector electrodes; and means for applying trigger pulses to one of said emitter electrodes.

22. A trigger circuit energizable from a voltage supply comprising: a translating device having an input and an output and characteristics to provide increased and decreased output current in response to increased and decreased input voltage, respectively; input and output circuits connected to the input and output, respectively, of said translating device for coupling said device to the voltage supply; a controllable impedance element connected in series with the input of said device; means for controlling the impedance of said element in response to decreased and increased output current variations to decrease and increase, respectively, the input voltage applied to said device and establish two stable conditions of operation of the trigger circuit; and a further similar translating device having an input and an output with its input connected in series with said impedance element and the input of said first-mentioned translating device to produce, at said output of said further translating device, current variations isolated from the current flow in said output circuit.

23. A trigger circuit comprising: a voltage supply; a translating device having an input and an output and characteristics to provide increased and decreased output current in response to increased and decreased input voltage, respectively; input and output circuits connecting said input and output, respectively, of said translating device to the voltage supply; an electron discharge device having an anode, cathode and control grid with the anode and cathode interposed in the input circuit between said translating device and said voltage supply and with said control grid coupled to the output circuit to vary the impedance of said electron discharge device, and thereby the input voltage applied to said translating device, directly with variations in the output circuit current to establish two stable operating conditions of the trigger circuit; and a further similar translating device having an input and an output with its input connected to the first-mentioned translating device and in series with said devices to produce, at said output of said further translating device, current variations isolated from the current flow in the first-mentioned translating device and the electron discharge device.

References Cited in the file of this patent

UNITED STATES PATENTS

| | | |
|---|---|---|
| 2,427,533 | Overbeck | Sept. 16, 1947 |
| 2,558,448 | MacSorley | June 26, 1951 |
| 2,562,530 | Dickinson | July 31, 1951 |
| 2,566,078 | Bliss | Aug. 28, 1951 |
| 2,568,918 | Grosdoff | Sept. 25, 1951 |
| 2,591,961 | Moore et al. | Apr. 8, 1952 |
| 2,594,731 | Connolly | Apr. 29, 1952 |
| 2,614,141 | Edson et al. | Oct. 14, 1952 |
| 2,620,448 | Wallace | Dec. 2, 1952 |
| 2,623,170 | Dickinson | Dec. 23, 1952 |
| 2,628,310 | Wood | Feb. 10, 1953 |